(12) United States Patent
Diaz et al.

(10) Patent No.: US 11,593,451 B2
(45) Date of Patent: Feb. 28, 2023

(54) SYSTEM AND METHOD FOR COMPARING ZONES FOR DIFFERENT VERSIONS OF A WEBSITE BASED ON PERFORMANCE METRICS

(71) Applicant: Content Square SAS, Paris (FR)

(72) Inventors: Luis Diaz, Paris (FR); Antoine Guo, Paris (FR); Lionel Seguin, Paris (FR)

(73) Assignee: Content Square SAS, Paris (FR)

( * ) Notice: Subject to any disclaimer, the term of this patent is extended or adjusted under 35 U.S.C. 154(b) by 63 days.

(21) Appl. No.: 17/004,506

(22) Filed: Aug. 27, 2020

(65) Prior Publication Data
US 2022/0067111 A1    Mar. 3, 2022

(51) Int. Cl.
*G06F 16/958*    (2019.01)
*G06F 16/9538*    (2019.01)
*G06F 16/954*    (2019.01)
*G06F 16/957*    (2019.01)

(52) U.S. Cl.
CPC .......... *G06F 16/958* (2019.01); *G06F 16/954* (2019.01); *G06F 16/9538* (2019.01); *G06F 16/9577* (2019.01)

(58) Field of Classification Search
CPC .. G06F 16/958; G06F 16/9538; G06F 16/954; G06F 16/957
See application file for complete search history.

(56) References Cited

U.S. PATENT DOCUMENTS

| | | | |
|---|---|---|---|
| 2012/0253885 A1* | 10/2012 | Newton | H04L 43/045 705/7.29 |
| 2012/0303552 A1* | 11/2012 | Zayas | G06Q 30/00 709/224 |
| 2013/0104034 A1* | 4/2013 | Ashpole | G06F 40/143 715/239 |
| 2015/0095145 A1* | 4/2015 | Shulman | G06F 16/9535 705/14.62 |
| 2016/0034915 A1* | 2/2016 | Soni | G06Q 30/0201 705/7.29 |
| 2016/0125083 A1* | 5/2016 | Dou | G06F 16/951 707/709 |
| 2018/0004717 A1* | 1/2018 | Anderson | G06F 16/9577 |
| 2018/0129744 A1* | 5/2018 | George | G06F 16/9535 |
| 2019/0244146 A1* | 8/2019 | Lane | G06N 20/00 |
| 2020/0012493 A1* | 1/2020 | Sagy | G06F 11/3428 |
| 2021/0203563 A1* | 7/2021 | George | H04L 41/142 |

* cited by examiner

*Primary Examiner* — Nathan Hillery
(74) *Attorney, Agent, or Firm* — Schwegman Lundberg & Woessner, P.A.

(57) ABSTRACT

A system and method for comparing zones for different versions of a website based on performance metrics are provided. The method includes collecting comparison versions of at least one website specified in a received comparison request; identifying at least one comparison zone in the collected comparison versions, wherein a comparison zone is a zone included in the at least one specified website; collecting at least one comparison zone metric for each of the at least one comparison zones for the collected comparison versions, wherein the at least one comparison zone metric is a numerical value related to a user interaction metric with the at least one comparison zone; analyzing the collected comparison zone metrics to determine zone performance; and returning the analysis results.

19 Claims, 10 Drawing Sheets

SYSTEM AND METHOD FOR COMPARING ZONES FOR DIFFERENT VERSIONS OF A WEBSITE BASED ON PERFORMANCE METRICS

TECHNICAL FIELD

The present disclosure relates generally to webpage a/b testing and, specifically, to methods and systems for comparing zones for different versions of a website using performance metrics.

BACKGROUND

As computer systems and networks continue to present new opportunities for individuals and organizations, website operators, owners, and administrators may seek to better understand the performance of various websites and webpages. Due to the open-ended nature of web design, quantifying website performance may prove difficult without clearly-established performance goals. Further, while established performance goals may provide insight into overall webpage performance, systems for discretizing performance to understand the contribution of each element of a website, to the overall performance of the website, remain inaccessible.

Although solutions to various facets of webpage optimization are available through manual collection of performance data, such as site user reviews, such solutions lack scalability, requiring a significant outlay of administrative time and effort to gather and analyze relevant performance data. Further, manual solutions lack the capacity to present different versions of a site side-by-side so that the performance gains or losses caused by various changes to the site may be appreciated. In addition, manual solutions lack the capacity to automatically gather website version histories, as well as performance metric data, reducing a website owner, administrator, or operator's ability to organize and compare large volumes of version and performance data.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method comparing zones for different versions of a website based on performance metrics. The method comprises collecting comparison versions of at least one website specified in a received comparison request; identifying at least one comparison zone in the collected comparison versions, wherein a comparison zone is a zone included in the at least one specified website; collecting at least one comparison zone metric for each of the at least one comparison zones for the collected comparison versions, wherein the at least one comparison zone metric is a numerical value related to a user interaction metric with the at least one comparison zone; analyzing the collected comparison zone metrics to determine zone performance; and returning the analysis results.

Certain embodiments disclosed herein also include a non-transitory computer readable medium having stored thereon instructions for causing a processing circuitry to execute a process for comparing zones for different versions of a website based on performance metrics, the process comprising: collecting comparison versions of at least one website specified in a received comparison request; identifying at least one comparison zone in the collected comparison versions, wherein a comparison zone is a zone included in the at least one specified website; collecting at least one comparison zone metric for each of the at least one comparison zones for the collected comparison versions, wherein the at least one comparison zone metric is a numerical value related to a user interaction metric with the at least one comparison zone; analyzing the collected comparison zone metrics to determine zone performance; and returning the analysis results.

In addition, certain embodiments disclosed herein include a system for comparing zones for different versions of a website based on performance metrics. The system comprises: a processing circuitry; and a memory, the memory containing instructions that, when executed by the processing circuitry, configure the system to: collect comparison versions of at least one website specified in a received comparison request; identify at least one comparison zone in the collected comparison versions, wherein a comparison zone is a zone included in the at least one specified website; collect at least one comparison zone metric for each of the at least one comparison zones for the collected comparison versions, wherein the at least one comparison zone metric is a numerical value related to a user interaction metric with the at least one comparison zone; analyze the collected comparison zone metrics to determine zone performance; and return the analysis results.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
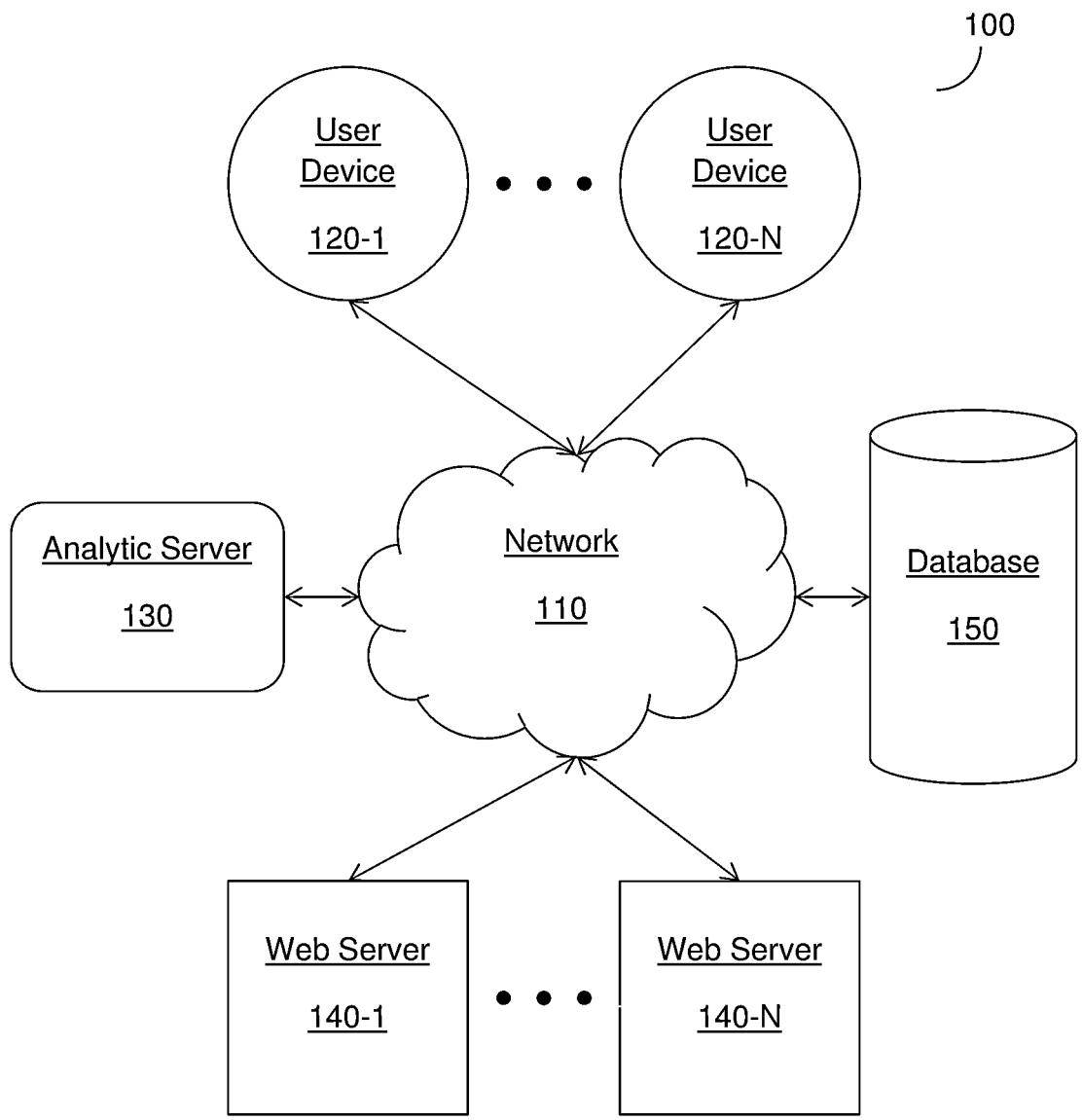
FIG. 1 is an example network diagram depicting a network system disclosing the embodiments for comparing zones for different versions of a website based on performance metrics.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram depicting a network system 100 disclosing the embodiments for comparing zones for different versions of a website based on performance metrics. The system 100 includes one or more user devices, 120-1 through 120-N (hereinafter, "user device" 120 or "user devices" 120), an analytic server 130, one or more web servers, 140-1 through 140-N (hereinafter "web server" 140 or "web servers" 140), and a database 150. Further, in the system 100, the various components listed are interconnected via a network 110.

The network 110 provides interconnectivity between the various components of the system. The network 110 may be, but is not limited to, a wireless, cellular or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise-virtualized components, or a hybrid physical-virtual network, including both physical and virtualized components. Further, the network 110 may be configured to encrypt data, both at rest and in motion, and to transmit encrypted, unencrypted, or partially-encrypted data. The network 110 may be configured to connect to the various components of the system 100 via wireless means such as, as examples and without limitation, Bluetooth™, long-term evolution (LTE), Wi-Fi, other, like, wireless means, and any combination thereof, via wired means such as, as examples and without limitation, ethernet, universal serial bus (USB), other, like, wired means, and any combination thereof. Further, the network 110 may be configured to connect with the various components of the system 100 via any combination of wired and wireless means.

The user devices 120 may be devices allowing a user to interact with the system 100 for purposes including, as examples and without limitation, providing webpage targets to the system 100 for analysis, receiving returns or outputs from the system 100, configuring system 100 parameters, other, like, purposes, and any combination thereof. Further, a user device 120 may be configured to receive returns or outputs from the web servers 140 to view webpages or other content developed by any of the web servers 140. A user device 120 typically includes a web browser (now shown) or any application (virtual, web, mobile, and the like) which allows a user to view, download, interact with, and engage with content provided by the web servers 140, the analytic server 130, or both. Examples of user devices 120 include, without limitation, smartphones, personal computers, business systems, dedicated kiosks, tablet computers, and other, like, devices.

In an embodiment, a user device 120 may be operated by an administrator of one or more websites hosted by the web server or servers 140. Through the user device 120, reports generated by the analytic server 130 may be viewed. The user device 120 may be further configured to allow for configuration of one or more components of the system 100, issuing or executing instructions, manipulating data, and the like.

The analytic server 130, depicted in detail with respect to FIG. 8, below, is a system configured to execute instructions, organize information, and otherwise process data. The analytic server 130 may be configured to execute the methods described hereinbelow, other, like, methods, and any combination thereof. As described with respect to FIG. 8, below, the analytic server 130 may include various processing, memory, networking, and other components allowing the analytic server 130 to execute instructions and provide data processing. The analytic server 130 may be implemented as physical hardware, as software virtualizing physical hardware, or as a combination of physical and virtualized components. The analytic server 130 may be connected to the network 110 via those means described with respect to the network 110, above. The various processes performed by the analytic server 130 are described in greater detail hereinbelow.

According to the disclosed embodiments, the analytic server 130 is configured to execute instructions for comparing zones for different versions of a website based on performance metrics. Zones refer to the various content elements, fields, and the like which, in combination, form the user-facing portions of a webpage or website. As an example, an online shopping website may include a search bar, a "go to cart" button, and a "home page" button, where the search bar and the various buttons are each webpage zones. Additional examples of zones, and the application and analysis thereof, are described hereinbelow. Performance metrics refer to various quantifiable factors related to goal achievement. As an example, where a given goal targets a fifteen percent newsletter sign-up rate, a corresponding performance metric may be the percentage of site visitors clicking on a "subscribe to newsletter" button. Additional examples of performance metrics are described hereinbelow.

The web servers 140 may be one or more web sources of data other than the inputs received from the user devices 120. The web servers 140 may include data relating to websites, data relating to webpages, other, like, data, and any combination thereof. Data from the web servers 140 may be stored in the database 150 and may be processed by the analytic server 130. Web servers 140 may be local web sources, remote web sources, or any combination thereof. Examples of web servers 140 include, without limitation, repositories of webpage information, "live" webpages, other, like, sources, and any combination thereof. Web servers 140 may be connected with the network 110 via the means described hereinabove.

The database 150 is a data store configured to archive data permanently or semi-permanently. The database 150 may be configured to store information received from one or more web servers 140, user devices 120, and other, like, components, as well as to store data relevant to the operation of the analytic server 130 and any outputs therefrom. The database 150 may be a local system, a remote system, or a hybrid remote-local system. Further, the database 150 may be configured as a full-physical system, including exclusively physical components, as a virtualized system, including only virtualized components, or as a hybrid physical-virtual system. Examples of devices which may be configured as a database 150 in the system 100 include, without limitation, local database hardware, cloud storage systems, remote storage servers, other, like, devices, and any combination thereof.

According to an embodiment, the database 150 may be configured to store or otherwise archive data relating to detection, identification, and analysis of webpage sessions including, without limitation, webpages, user interactions, user sessions, other, like, data, and any combination thereof. Further, the database 150 may be configured to transfer, to and from the analytic server 130, data necessary for the execution of the methods described hereinbelow, and may store or otherwise archive analytic server 130 inputs, analytic server 130 outputs, or both.

Figure 2:
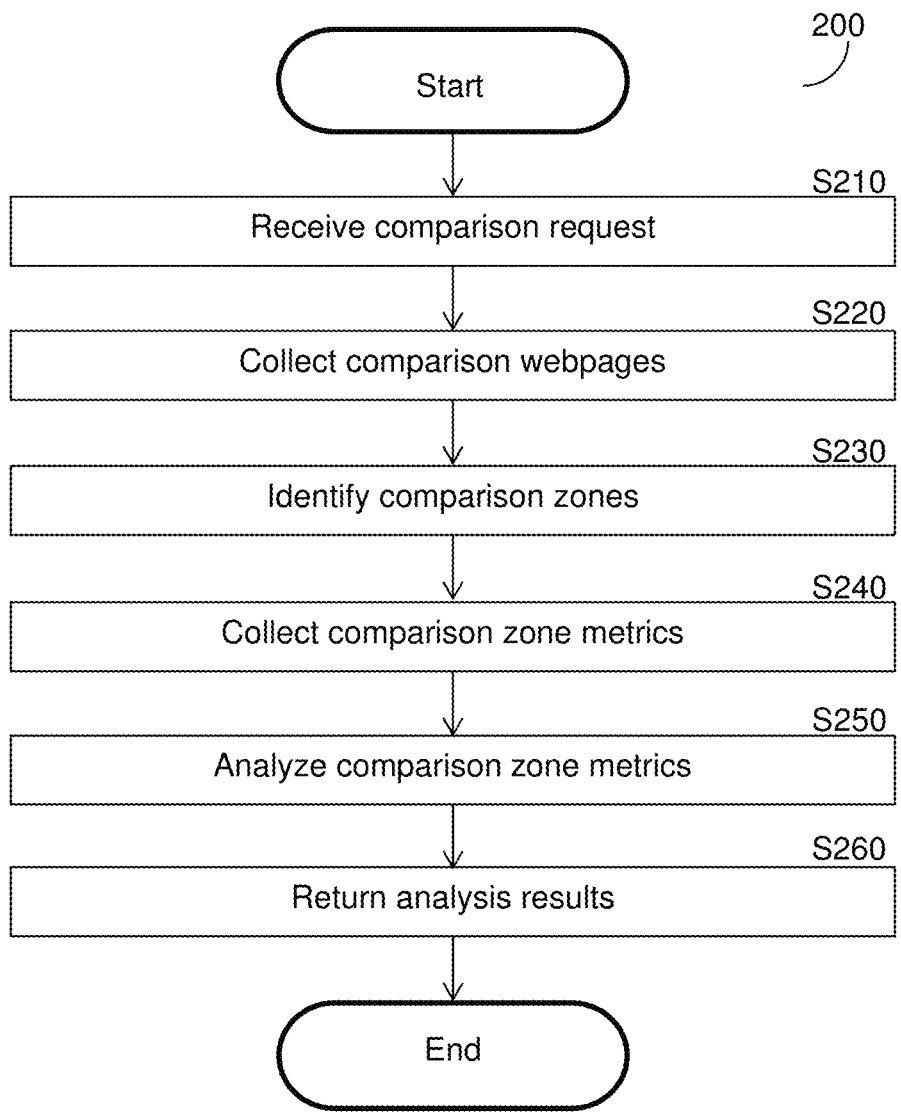
FIG. 2 is a flowchart depicting a method for comparing zones for different versions of a website based on performance metrics.

FIG. 2 is a flowchart 200 depicting a method for comparing zones for different versions of a website based on performance metrics.

At S210, a comparison request is received. A comparison request is a message, command, or other request which may configure an analytic system, such as the system described with respect to FIG. 1, above. To compare different versions of one or more webpages. A comparison request may include data specifying one or more webpages for comparison, a first date for comparison, a second date for comparison, a metric analysis date range, one or more metrics of interest, and the like, as well as any combination thereof. A comparison request may be generated by, and received from, one or more user devices, such as the user devices, 120, of FIG. 1, above. A comparison request may be generated by user interaction with a comparison request tool or form, as may be included in, or accessed by, a browser (not shown), an application (not shown), or another, like, program, included in a user device.

The first date specified in the comparison request may specify a first date, where an archived snapshot of the specified webpage on the first date may be specified for comparison. Similarly, the second date, if included in the comparison request, may specify a date for comparison of the corresponding snapshot with the snapshot corresponding with the first date. Where the comparison request does not include a second date, the second date may be set or updated to be equal to the most recent date for which a webpage snapshot is recorded, including the current date at the date of comparison request receipt. Metrics of interest, as may be included in a comparison request, specify one or more metrics, for which a user, administrator, or operator may wish to view per-zone metric contributions within the webpage or webpages. As an example, a specified metric of interest may be an "average hover time," describing the average amount of time for which users hover the mouse cursor over given elements of the webpage. The various features included in a comparison request are described in greater detail with respect to FIG. 4a, below.

At S220, comparison webpages are collected. Comparison webpages are one or more versions of the same webpage, collected for metric comparison of the various versions. Comparison webpages may include current or "live" webpages, archived webpages, and any combination thereof. Archived webpages may be saved "complete" webpages, webpage resources, webpage background code, such as in hypertext markup language (HTML) and cascading style sheets (CSS), webpage document object models (DOMs), and the like, as well as any combination thereof. A detailed description of webpage DOMs is provided with respect to FIG. 6, below. Comparison webpages may be collected from sources including, without limitation, the web servers 140 and database 150 of FIG. 1, above. Comparison webpages may be collected where the collected webpages include a date stamp, tag, label, or other date-indicating data feature, matching a date included in the comparison request received at S210. The collection of comparison webpages is described in greater detail with respect to FIG. 3, below.

At S230, comparison zones are identified. Comparison zones are those zones of a comparison webpage, such as the comparison webpages collected at S220, which are relevant to the comparison request received at S210. Comparison zones may be identified by a specification of certain zones or types of zones, such as in the received comparison request, by specification of zones or types of zones relevant to one or more specified metrics of interest, such as may be specified in the received comparison request, and by other, like, means. Comparison zones may be webpage zones, elements, or other, like, user-facing features, with which a user may interact in a manner capable of generating comparison zone metrics, such as those comparison zone metrics described with respect to S240, below. As an example, a comparison zone may be a "product image" element, with which users may have interacted by clicking or hovering, with each action contributing to the actions' respective metric calculations.

Comparison zones may be identified in one or more comparison webpages, such as those collected at S220, including both current, or "live," webpages, as well as archived webpages. Comparison zones may be identified by application of one or more zone-identification algorithms, scripts, or methods. Identified comparison zones may be recorded by means including, without limitation, attaching a data label or tag to relevant sections of a complete webpage, webpage HTML, or webpage DOM, generating corresponding files specifying the identified content zones, by other, like, methods, and any combination thereof.

At S240, comparison zone metrics are collected. Comparison zone metrics are metrics describing the contribution of each comparison zone, as identified at S230, to one or more goals. Comparison zone metrics may include, as examples, metrics describing the number of users who completed a sale after clicking a button, the percentage of site visitors who disconnected a site visit after hovering over a content zone, the average number of user clicks on a given element, and the like. Comparison zone metrics may be collected from one or more metrics archives. Metrics archives may be generated during execution of a method for collecting and storing comparison webpages and metrics, as is described with respect to FIG. 3, below. Comparison zone metrics may be retrieved from one or more sources including, without limitation, the analytic server 130 and the database 150, both of FIG. 1, above. Comparison zone metrics may be retrieved for specified date ranges, such as may be included in a comparison request, such as that received at S210. Where comparison zone metrics are retrieved for a specified date range, the retrieved comparison zone metric may include only metric data collected during the specified date range. The selection of comparison zone date ranges is described in greater detail with respect to FIG. 4b, below.

At S250, comparison zone metrics are analyzed. Comparison zone metrics are analyzed to determine comparison zone contributions to various goals, as well as to determine metric differences between one or more versions of a webpage or website. Comparison zone metric analysis may include, as examples and without limitation, identification of comparison zones corresponding to high and low metric values, identification of average metric values for an element, webpage, or version, metric value changes with time, other, like, analyses, and any combination thereof.

At S260, analysis results are returned. Analysis results include outputs and other results of the analyses executed at S250. Analysis results may be returned in formats including, without limitation, marked webpages, HTML codebases, DOM trees and the like, as webpage-independent tables, charts, and the like, as machine-interpretable datasets, such as comma-separated value (CSV) files, in other, like, formats, and any combination thereof. Where analysis results are returned as marked webpages, the returned marked webpages may include zone-level metric analyses, indicating the metric values of each identified zone included in the webpage. Examples of visual outputs returned at S260 are described with respect to FIGS. 4a and 5, below.

Figure 3:
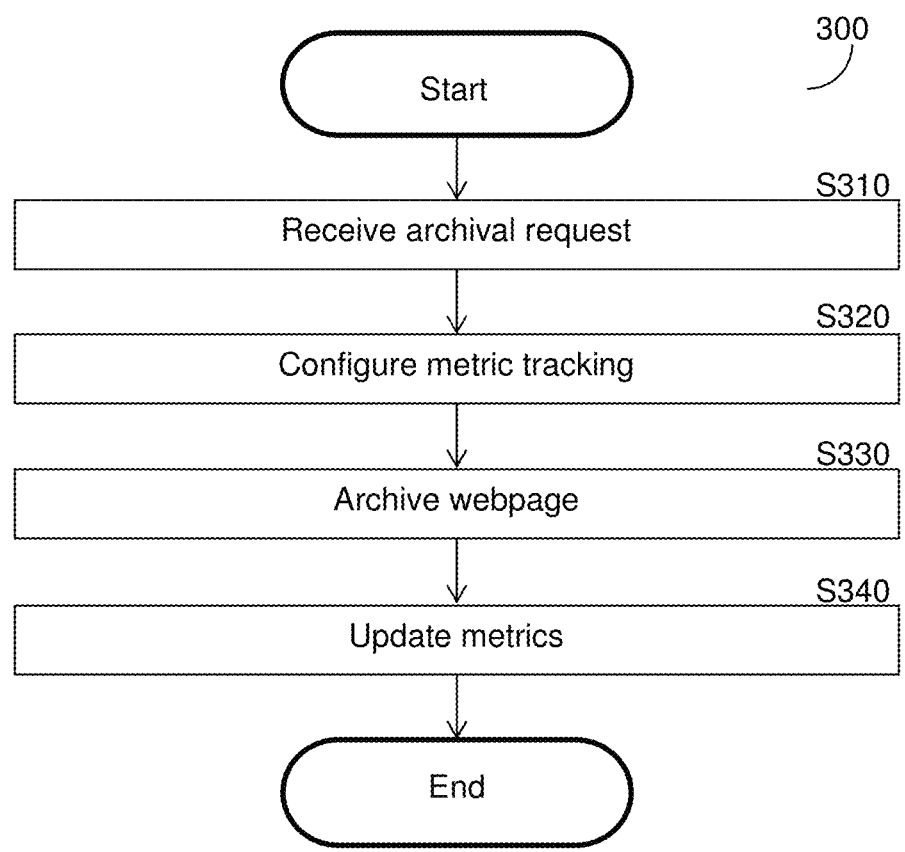
FIG. 3 is a flowchart depicting a method for collecting and storing comparison webpages and metrics, according to an embodiment.

FIG. 3 is a flowchart 300 depicting a method for collecting and storing comparison webpages and metrics, according to an embodiment.

At S310, an archival request is received. An archival request is a request specifying one or more webpages for webpage archival and metric collection. An archival request may include data including, without limitation, an archival schedule, one or more uniform resource locators (URLs), other, like, data, and any combination thereof. An archival request may be generated by, and received from, without limitation, the user devices 120 of FIG. 1, above, as well as other, like, sources. Further, archival requests may be generated during the operation or initiation of other processes, including processes configured to initiate ongoing archival and metric tracking for one or more websites. An archival schedule, as may be included in an archival request, may include a specification of an archival date range, such as a one-month archival period, an archival frequency, such as weekly or daily archival, other, like, parameters relating to the timing of webpage archival, and any combination thereof. Receipt of an archival request at S310 may further include creation of one or more metric archival registers, or other, like, data features configured to store metric data, such that the stored metric data may be updated on a periodic basis, a continuous basis, or both.

At S320, metric tracking is configured. Configuration of metric tracking refers to the initiation and parameterization of a metric tracking scheme for one or more websites, such as the websites indicated by the URLs specified in the archival request received at S310. Metrics, as described hereinabove, are quantifications of goal-related site interactions such as, as examples, and without limitation, the time which a given user spends hovering over a product image on a retail website. Goals, for which various metrics may be more or less applicable, refer to predefined or user-defined website objectives. For each goal, one or more metrics may be applicable. As an example, a user-defined goal may be to reduce the percentage of site visitors who end a site visit without viewing a "cart" page below a defined threshold. In the same example, goal-related metrics may include percentages of users who click a "cart" button, percentages of users who click an "add item to cart" button, and the like.

Metric tracking may be configured through one or more configuration tools, as are described in detail with respect to FIGS. 7a and 7b, below. Goal and metric configuration tools may be included in a web platform accessible through a browser, in a designated administrative terminal, in an application installed on a user device, such as the user devices 120 of FIG. 1, above, and the like.

Where metric tracking is configured, S320 may further include implementation of one or more metric tracking schemes. Metric tracking schemes may be implemented by inclusion of a tracking element in a webpage's underlying code. A tracking element may be a tag, script, or other element configured to collect user interactions with the webpage in which the element is included. A tracking element may be invisible and non-interactive and may be configured such that a site visitor cannot isolate or modify the tracking element.

At S330, one or more webpages are archived. Webpages may be archived according to a predefined schedule, as may be included in the archival request received at S310, above. Webpages may be archived, saved, or otherwise preserved for subsequent analysis by storage of a complete webpage, a webpage's underlying codebase, such as HTML or CSS, a webpage's resources, such as image files included in the webpage, webpage DOMs, other, like, data, and any combination thereof, to a memory or storage, such as the database, 150, of FIG. 1, above. Webpages may be archived by execution of a script, application, or other program operating on an analytic server, such as the analytic server, 130, of FIG. 1, above, where the script, application, or other program may be configured to archive webpages, including in those formats described hereinabove. Archived webpages may further include a download information tag, describing data such as, as examples and without limitation, the version of the website, such as mobile or desktop, the time and date of archival, other, related, information, and any combination thereof. A download information tag may be included in a modified version of the archived webpage, may be attached to the archived version as metadata, may be stored in a separate download information register, and the like, as well as any combination thereof.

It may be understood that S330 may be performed at any point after S310, including concurrently with S320, without loss of generality or departure from the scope of the disclosure.

At S340, metrics are updated. Metrics are updated by collection of user site-interaction data during the time between a visitor's connection to the webpage or site and the same visitor's disconnection from the site. Metrics may be collected according to the configurations described hereinabove, by use of a page-embedded tracking tag, or by other like means, and may be updated by revision of one or more metric archival registers, such as those described with respect to S310. Metrics may be updated on a continuous basis, with every recordable user interaction included in a register revision in real-time or near-real-time. Further, metrics may be updated on periodic bases, such as daily. Where metrics are updated on periodic bases, collected metrics may be included in the next scheduled register revision following collection. Metrics may be updated according to one or more schemes specified in the metric tracking configuration described with respect to S320, in the archival request received at S310, or both.

It may be understood that S340 may be performed at any point after S310, including concurrently with S320, S330, or both, without loss of generality or departure from the scope of the disclosure.

Figure 4A:
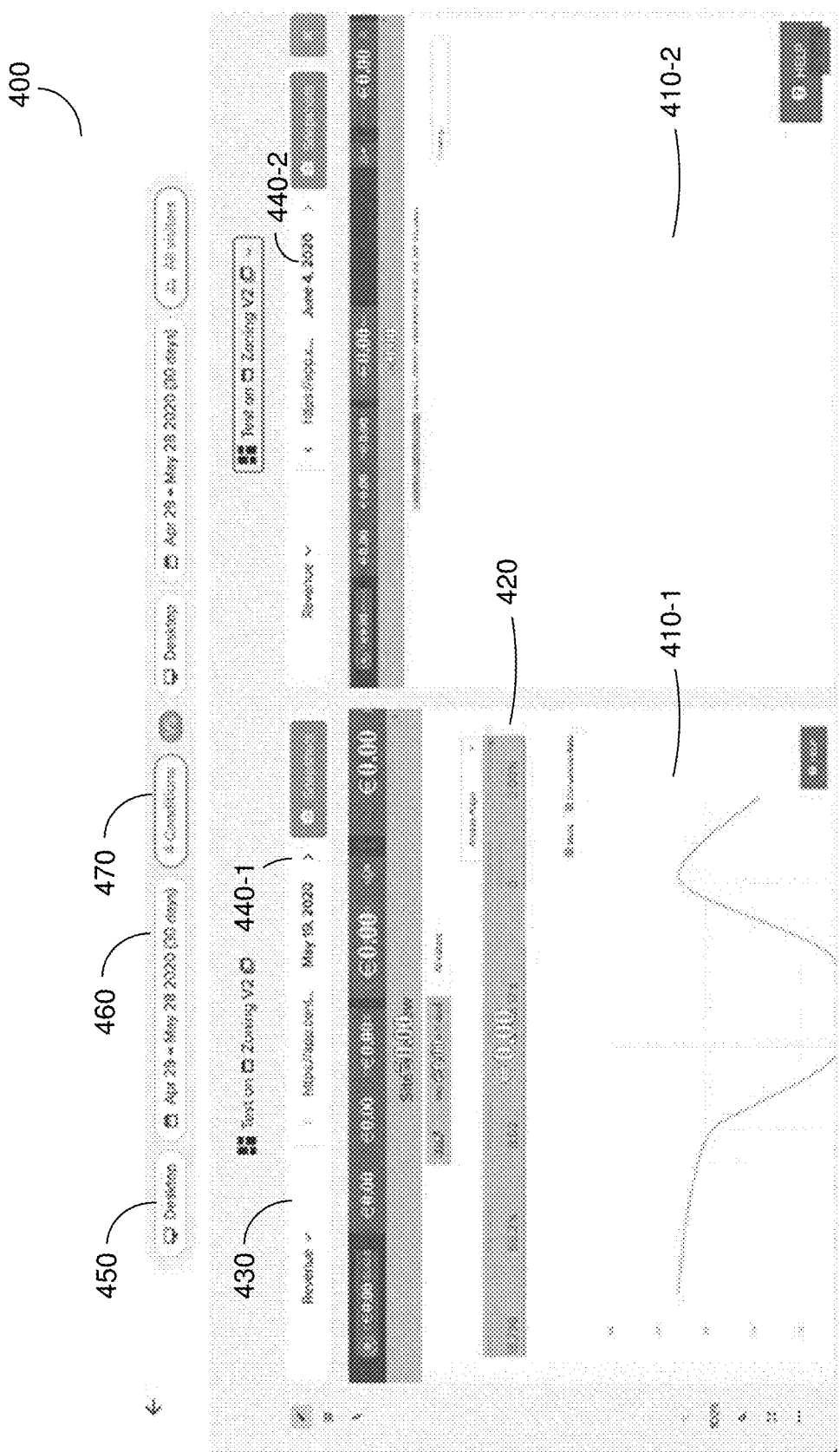
FIG. 4a is an illustration depicting a platform for presenting performance metric comparisons for two versions of a website, according to an embodiment.

FIG. 4a is an illustration depicting a platform 400 for presenting performance metric comparisons for two versions of a website, according to an embodiment. The platform includes various features which may be configured to provide for a visual representation of webpage analysis results, such as may be returned at S260 of FIG. 2, above. The platform includes first and second page viewing panes, 410-1 and 410-2, where each viewing pane includes a version of a specified website at the date selected using the corresponding page date selectors, 440-1 and 440-2, where the website versions displayed are collected as part of a comparison process, such as at S220 of FIG. 2, above. The platform 400 further includes multiple metric evaluation overlays 420. Metric evaluation overlays 420 provide metric value data, as may be determined, such as at S250 of FIG. 2, above, for the respective version of the displayed webpage on a per-zone basis. Metric data included in the metric evaluation overlays 420 is aggregate metric data collected, as described hereinabove, and filtered by application of the view mode selectors 450, the date range selectors 460, and the conditions selector 470. The metric evaluation overlays 420 display metric values corresponding to the metric type specified using the metric type selector 430. In the example illustration, the metric type selector 430 indicates a "revenue" metric, and the metric evaluation overlays 420 include collected metric data describing the revenue impact of each highlighted zone. Although only one metric evaluation overlay 420 is shown for purposes of simplicity, it may be understood that all, like, metric evaluation overlays 420 may be so labeled without loss of generality or departure from the scope of the disclosure.

The page date selectors, 440-1 and 440-2, may be configured to provide for selection of various versions of a webpage from a repository of available versions. The page date selectors, 440-1 and 440-2, may be configured to provide for selection only of dates corresponding to webpage versions included in the repository. Further, the platform 400 includes a metric type selector 430 which may be configured to provide for selection of one or more metrics of interest for display through the metric evaluation overlays 420. The metric type selector 430 may be configured to provide for selection of one or more predefined metrics, such as may be included in a metric register, as described herein. Although only one metric type selector 430 is shown for sake of simplicity, it may be understood that metric type selectors 430 for all viewing panes 410 may be so labeled without loss of generality or departure from the scope of the disclosure.

The view mode selector 450 may be configured to provide for selection of a view mode from a list of view modes. A view mode may be a website configuration designed and implemented for a specific device or family of devices, such as mobile devices, desktop computers, and the like. The date range selector 460 may be configured to provide for selection of one or more date ranges, for which applicable metric values are calculated from the collected metric values. The operation of the date range selector 460 is described in detail with respect to FIG. 4b, below. The conditions selector 470 may be configured to provide for the selection of miscellaneous data filters for purposes such as, as examples and without limitation, evaluating only data generated from users in a particular country, evaluating data for all users but users having internet protocol (IP) addresses within a given range of IP addresses, for other, like, purposes, and any combination thereof. Although the selectors, 450-470, are labeled with respect to a first viewing pane 410-1 for sake of simplicity, it may be understood that corresponding selectors for other viewing panes may be so labeled without loss of generality or departure from the scope of the disclosure.

Figure 4B:
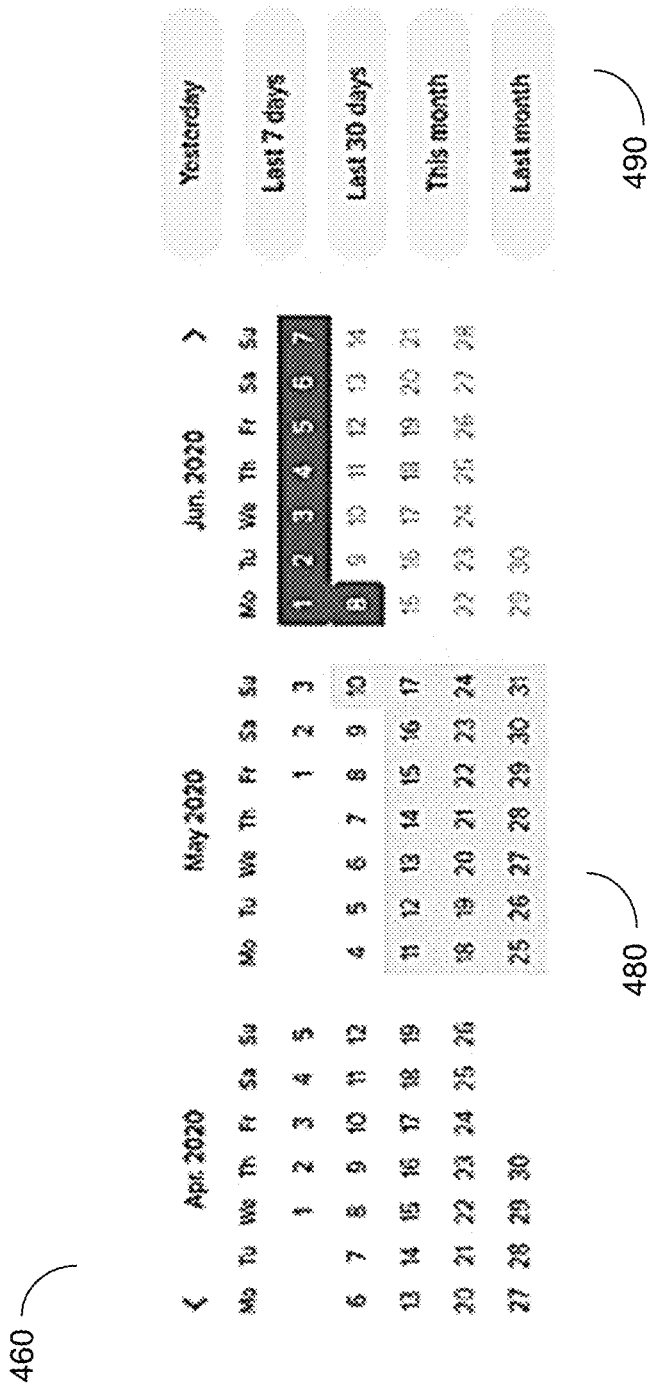
FIG. 4b is an illustration depicting a date range selection tool for a platform for presenting performance metric comparisons for two versions of a website, according to an embodiment.

FIG. 4b is an illustration depicting a date range selection tool 460 for a platform for presenting performance metric comparisons for two versions of a website, according to an embodiment. The date range selector 460 may be configured to provide for calculations of metric values, as described hereinabove, using data collected during a specified date range. The date range selector 460 includes multiple date-selection panes 480, which may be configured as seven-day calendars, depicting various days, months, weeks, and the like. The date range selector 460 may be further configured to provide for selection of a date range beginning on a first clicked date and ending on a second clicked date. In addition, the selector includes a quick-selection feature 490, which may be configured to provide for selection of various pre-defined date ranges including, as examples and without limitation, the previous day, the previous seven days, the previous thirty days, the current calendar month, the previous calendar month and other, like, ranges. In an embodiment, the date range selector 460 may be configured to provide for selection of multiple date ranges in a single selection, providing for isolated analysis of metric tracking data during only those periods selected.

Figure 5:
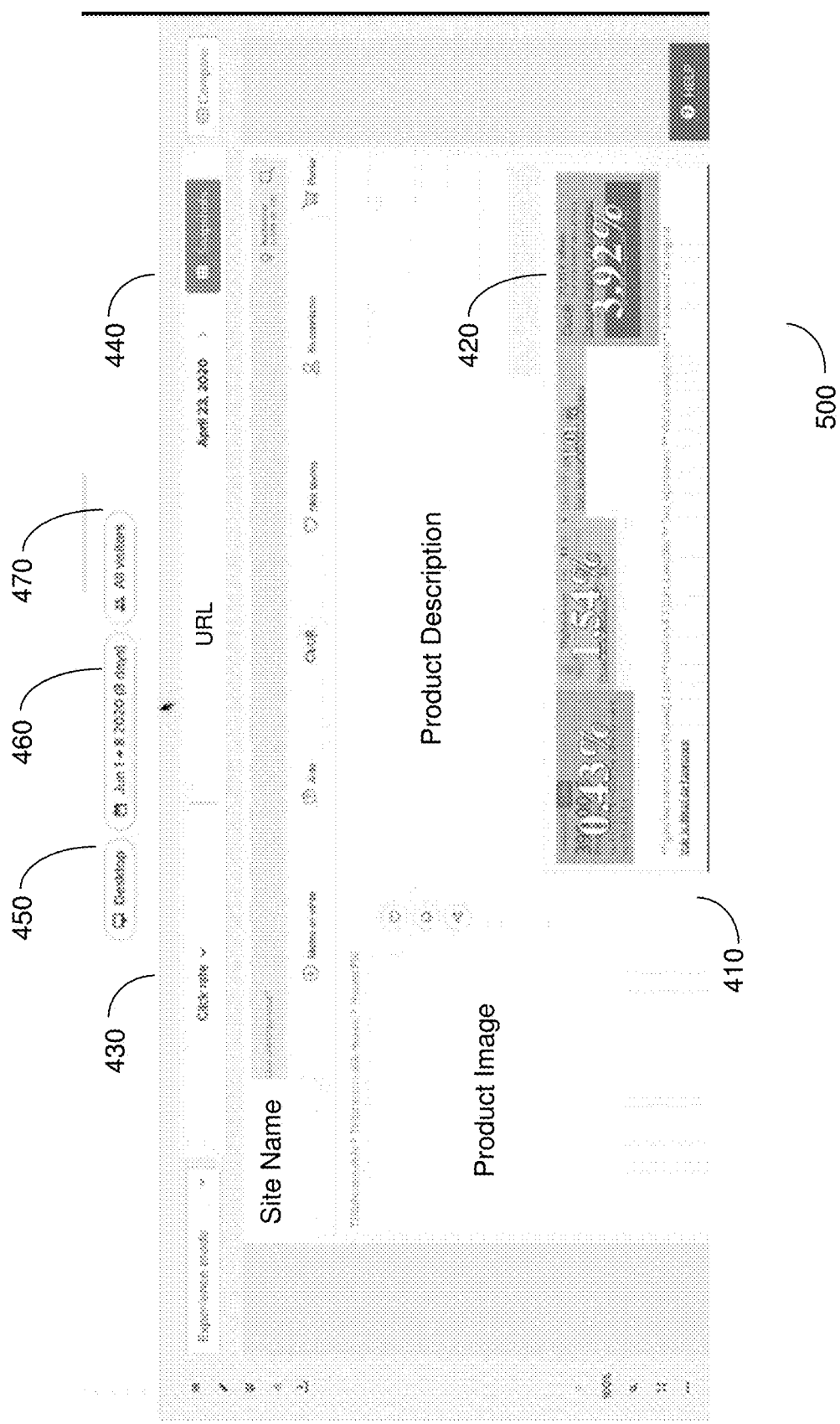
FIG. 5 is an illustration depicting a visual presentation of a single-version webpage performance metric zone analysis, according to an embodiment.

FIG. 5 is an illustration 500 depicting a visual presentation of a single-version webpage performance metric zone analysis, according to an embodiment. The single-version webpage performance metric zone analysis presented in the illustration 500 includes features similar or identical to those included in the version-comparison presentation included in FIG. 4a, above, and provides for visual analysis of goal-related metrics on a per-zone basis. As in FIG. 4a, above, the presentation included in the illustration 500 includes a viewing pane 410, a metric evaluation overlay 420, a metric type selector 430, and a page date selector. Further, as above, the presentation included in the illustration 500 includes a view mode selector 450, a date range selector 460, and a conditions selector 470.

Figure 6:
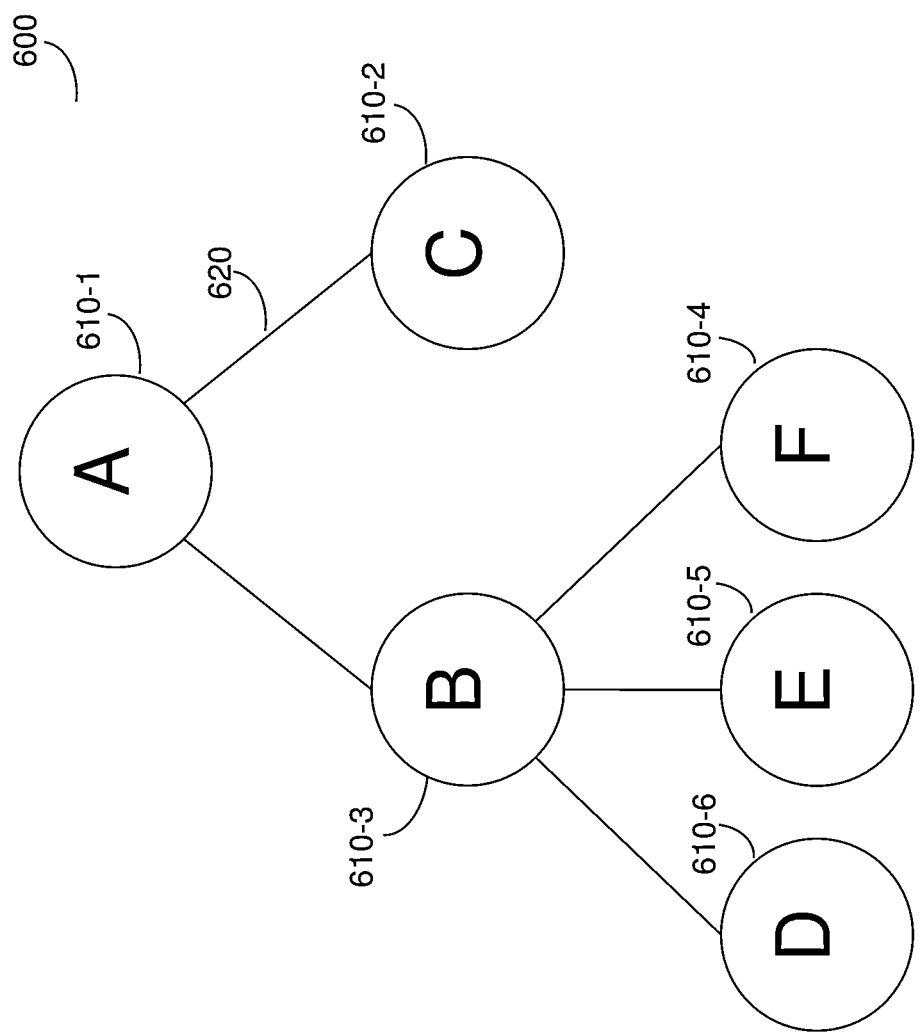
FIG. 6 is an example diagram depicting an unlabeled document object model (DOM) tree, according to an embodiment.

FIG. 6 is an example diagram depicting an unlabeled document object model (DOM) tree 600, according to an embodiment. The unlabeled DOM tree 600 provides a visual representation of the hierarchical structure of a webpage's HTML code, with content zones or elements represented as nodes, 610-1 through 610-6 (hereinafter, "nodes" 610). In the example unlabeled DOM tree 600, related nodes 610 are joined by "links" 620, representing the relationships between two nodes 610. In the example unlabeled DOM tree 600, links 620 are established between nodes 610-1 and 610-2 and between nodes 610-3 and 610-1.

In the example unlabeled DOM tree 600, nodes 610-3 and 610-2 are disposed on a second tier below the first tier occupied by node 610-1, reflecting a structure wherein the content element or zone represented by node 610-1 includes the content elements or zones represented by nodes 610-2 and 610-3. Although only the link 620 between nodes 610-1 and 610-2 is labeled, this label is provided for simplicity, and other, like, links 620 may be likewise labeled without loss of generality or departure from the scope of the disclosure.

Figure 7A:
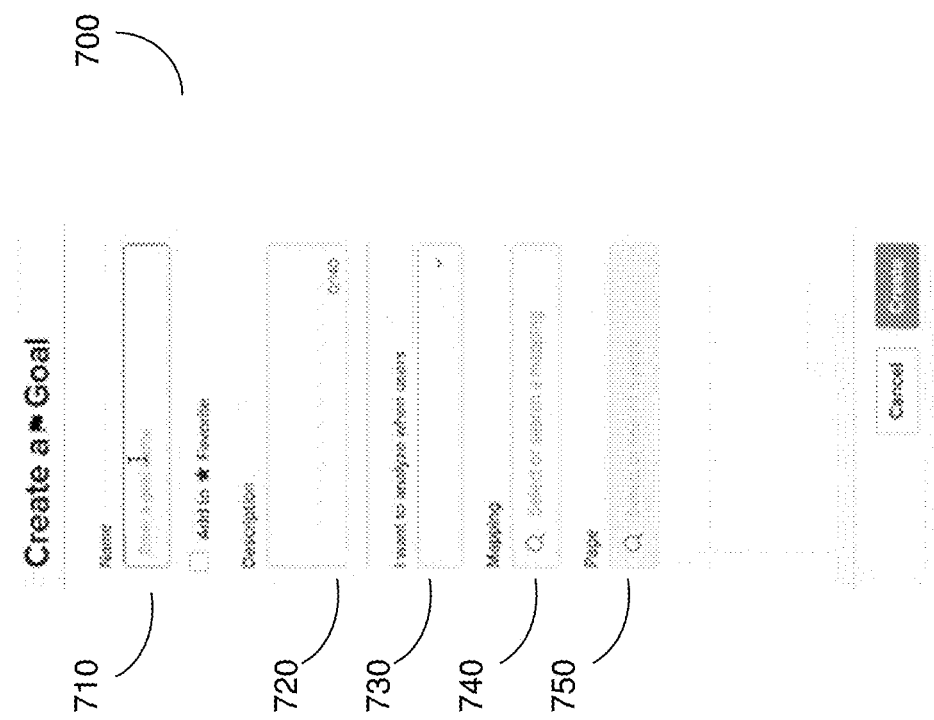
FIG. 7a is an illustration describing a goal definition tool, according to an embodiment.

FIG. 7a is an illustration 700 describing a goal definition tool, according to an embodiment. A goal definition tool provides for selection of custom goal parameters, as may be applicable to the definition of an undefined goal, as described with respect to S320, above. A goal definition tool may be configured to provide for the generation of custom goals for purposes including, without limitation, metric tracking as described hereinabove. A goal definition tool, as depicted with respect to the illustration 700, includes a name field 710, a description field 720, a behavior analysis selector 730, a mapping selector 740, and a page selector 750. The name field 710 may be configured to provide for assignment of custom names to user-defined goals. Further, the description field 720 may be configured to provide for assignment of custom descriptions to user-defined goals including, as examples and without limitation, explanations of goal functions, explanations of goal metric tracking operation, descriptions of goal applicability, and the like, as well as any combination thereof.

The goal definition tool included in the illustration 700 includes a behavior analysis selector 730. The behavior analysis selector 730 provides for selection of user activities or in-page interactions including, as examples and without limitation, clicks, mouse cursor hovers, keystroke entries, and the like. The mapping selector 740 provides for selection of one or more mappings to which the user-defined goal is applicable. A mapping refers to a family or group of URLs, such as an English-language version of a webpage and the corresponding French and Spanish-language versions of the same webpage. The page selector 750 provides for selection of one or more pages from the mapping selected using the mapping selector 740. In the same example provided above with respect to the mapping including various translations of a given webpage, a page selector 750 may provide for the selection of an English version of "cart" page, selected from a list of pages included in the specified mapping.

In an embodiment, a goal definition tool, such as is included in the illustration 700, may include a zone selector. A zone selector may be configured to provide for selection of individual zones of a given webpage, where the same given webpage is selected from a list of pages included in a selected mapping. A zone selector may be configured to provide for selection of individual identified zones, classes of zones, the like, and any combination thereof. Zones included in a list of zones provided for selection in the zone selector tool may include zones identified by application of automatic zone detection techniques.

Figure 7B:
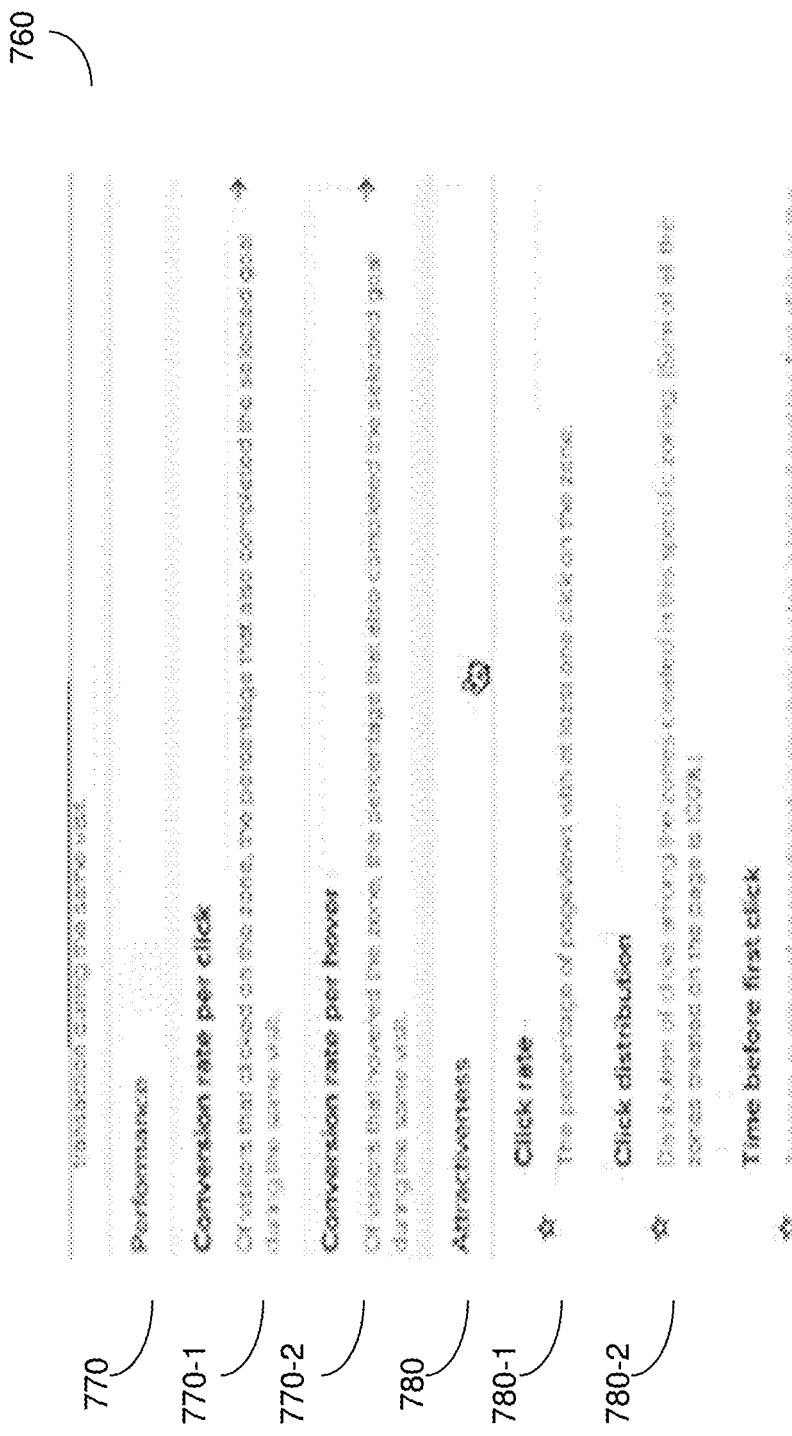
FIG. 7b is an illustration describing a goal selection tool, according to an embodiment.

FIG. 7b is an illustration 760 describing a goal selection tool, according to an embodiment. The goal selection tool provides for the selection of one or more goals and metrics for configuration of metric tracking, such as at S320 of FIG. 3, above. The goal selection tool includes a list of goals, 770 and 780, subdivided into the goals' respective metrics, 770-1 through 770-2 and 780-1 through 780-2. The goal selection tool may be configured to provide for selection of one or more goals or metrics based on user input. Where a goal is selected, all component metrics relevant to that goal may be selected. Where individual metrics are selected, metrics corresponding to one or more different goals may be selected to provide for an enhanced metric analysis experience. Where metrics are selected by selection of goals, individual metrics may be subsequently de-selected in the same manner as goals or metrics might be selected, such as by clicking the respective goals or metrics. The goal selection tool may be configured to receive input from one or more users, administrators, operators, or other, like, parties, via systems including, without limitation, user devices, such as the user devices 120 of FIG. 1, above, analytic systems, such as the analytic server, 130, of FIG. 1, above, other, like, systems, and any combination thereof.

Figure 8:
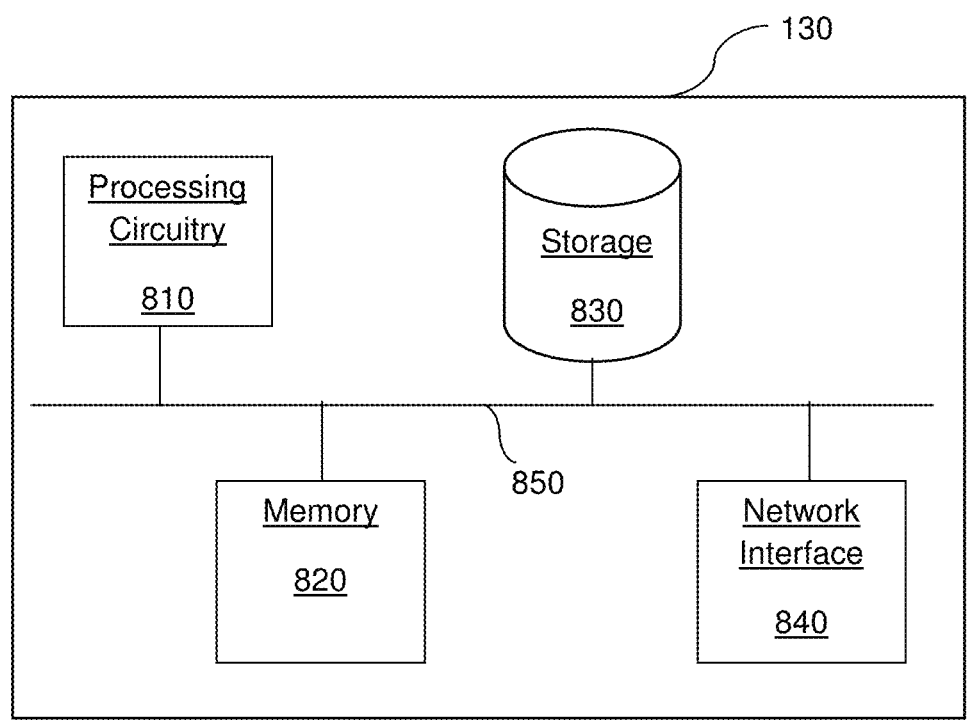
FIG. 8 is an example schematic diagram of an analytic server, according to an embodiment.

FIG. 8 is an example schematic diagram of an analytic server 130, according to an embodiment. The analytic server 130 includes a processing circuitry 810 coupled to a memory 820, a storage 830, and a network interface 840. In an embodiment, the components of the server 130 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the analytic server 130 to communicate with the various components, devices, and systems described herein for comparing zones for different versions of a website based on performance metrics.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method comprising:
    receiving a comparison request including an identification of a website and an identification of a zone or a type of zone;
    collecting a plurality of comparison versions of the website based on the identification of the website;
    identifying a comparison zone in each of the comparison versions of the website based on the identification of the zone or the type of zone;
    collecting a comparison zone metric associated with the comparison zone for each of the comparison versions, wherein the comparison zone metric is based on at least one user interaction metric with the comparison zone;
    analyzing the comparison zone metric of each of the comparison versions to determine a zone performance metric for the comparison zone; and
    causing user interface to be displayed by a display device, the user interface including the zone performance metric for the comparison zone.

2. The method of claim 1, wherein the user interaction metric is associated with a user interaction performed by a user on the website displayed on a client device, the user interaction includes a mouse click, a scroll, a mouse hover; a text entry, a navigation through a plurality of webpages included in the website.

3. The method of claim 1, wherein the user interface includes a display of at least one of the comparison versions of the website.

4. The method of claim 3,
    wherein the user interface includes the zone performance metric displayed as an overlay on the display of the comparison zone of at least one of the comparison versions of the website.

5. The method of claim 1, further comprising:
    receiving an archival request including the identification of the website and a metric;
    configuring a metric tracking tool using at least one goal related to the metric;
    archiving a webpage associated with the identification of the website in the archival request; and
    updating the metric, based on data received from the metric tracking tool.

6. The method of claim 5, wherein configuring the metric tracking tool further comprises:
    defining the at least one goal, wherein the at least one goal is a pre-defined website objective.

7. The method of claim 6, wherein defining the at least one goal further comprises:
    identifying a relevant zone, wherein the relevant zone comprises a webpage content element or zone related to the at least one goal.

8. The method of claim 1, wherein the zone comprises a website content element included in a display of the website.

9. The method of claim 1, wherein the comparison zone metric comprises a numerical value defining a count, a rate, or any combination thereof.

10. A non-transitory computer-readable storage medium having stored thereon instructions, when executed by a processor, causes the processor to perform operations comprising:
    receiving a comparison request including an identification of a website and an identification of a zone or a type of zone;
    collecting a plurality of comparison versions of the website based on the identification of the website;
    identifying a comparison zone in each of the comparison versions of the website based on the identification of the zone or the type of zone;
    collecting a comparison zone metric associated with the comparison zone for each of the comparison versions, wherein the comparison zone metric is based on at least one user interaction metric with the comparison zone;
    analyzing the comparison zone metric of each of the comparison versions to determine a zone performance metric for the comparison zone; and
    causing user interface to be displayed by a display device, the user interface including the zone performance metric for the comparison zone.

11. A system comprising:
    a processing circuitry; and
    a memory having stored thereon instructions that, when executed by the processing circuitry, causes the system to perform operations comprising:
    receiving a comparison request including an identification of a website and an identification of a zone or a type of zone;
    collecting a plurality of comparison versions of the website based on the identification of the website;
    identifying a comparison zone in each of the comparison versions of the website based on the identification of the zone or the type of zone;
    collecting a comparison zone metric associated with the comparison zone for each of the comparison versions, wherein the comparison zone metric is based on at least one user interaction metric with the comparison zone;

analyzing the comparison zone metric of each of the comparison versions to determine a zone performance metric for the comparison zone; and causing user interface to be displayed by a display device, the user interface including the zone performance metric for the comparison zone.

12. The system of claim 11, wherein the user interaction metric is associated with a user interaction performed by a user on the website displayed on a client device, the user interaction includes a mouse click, a scroll, a mouse hover, a text entry, a navigation through a plurality of webpages included in the website.

13. The system of claim 11, wherein the user interface includes a display of at least one of the comparison versions of the website.

14. The system of claim 13,
wherein the user interface includes the zone performance metric displayed as an overlay on the display of the comparison zone of at least one of the comparison versions of the website.

15. The system of claim 11, wherein the operations further comprising:

receiving an archival request including the identification of the website and a metric;

configuring a metric tracking tool using at least one goal related to all the metric;

archiving a webpage associated with the identification of the website in the archival request; and updating the metric based on data received from the metric tracking tool.

16. The system of claim 15, wherein configuring the metric tracking tool further comprises defining the at least one goal, wherein the at least one goal is a pre-defined website objective.

17. The system of claim 16, wherein defining the at least one goal further comprising:

identifying a relevant zone, wherein the relevant zone comprises a webpage content element or zone related to the at least one goal.

18. The system of claim 11, wherein the zone comprises a website content element included in a display of the website.

19. The system of claim 11, wherein the comparison zone metric comprises a numerical value defining a count, a rate, or any combination thereof.

* * * * *

UNITED STATES PATENT AND TRADEMARK OFFICE
CERTIFICATE OF CORRECTION

| | |
|---|---|
| PATENT NO. | : 11,593,451 B2 |
| APPLICATION NO. | : 17/004506 |
| DATED | : February 28, 2023 |
| INVENTOR(S) | : Diaz et al. |

It is certified that error appears in the above-identified patent and that said Letters Patent is hereby corrected as shown below:

In the Specification

In Column 3, Line 30, delete "devices," and insert --devices-- therefor

In Column 3, Line 32, delete "servers," and insert --servers-- therefor

In Column 5, Line 37, delete "devices," and insert --devices-- therefor

In Column 8, Line 30, delete "database," and insert --database-- therefor

In Column 9, Line 11, delete "panes," and insert --panes-- therefor

In Column 9, Line 14, delete "selectors," and insert --selectors-- therefor

In Column 9, Line 36, delete "selectors," and insert --selectors-- therefor

In Column 9, Line 39, delete "selectors," and insert --selectors-- therefor

In Column 10, Line 2, delete "selectors," and insert --selectors-- therefor

In Column 10, Line 48, delete "nodes," and insert --nodes-- therefor

In Column 11, Line 49, delete "goals," and insert --goals-- therefor

In Column 11, Line 50, delete "metrics," and insert --metrics-- therefor

In Column 11, Line 66, delete "server," and insert --server-- therefor

Signed and Sealed this
Second Day of July, 2024

Katherine Kelly Vidal
*Director of the United States Patent and Trademark Office*

CERTIFICATE OF CORRECTION (continued)
U.S. Pat. No. 11,593,451 B2

In the Claims

In Column 13, Line 62, in Claim 2, delete "hover;" and insert --hover,-- therefor In Column 14, Line 13, in Claim 5, delete "metric," and insert --metric-- therefor In Column 16, Line 2, in Claim 15, after "to", delete "all"